Figure 1:
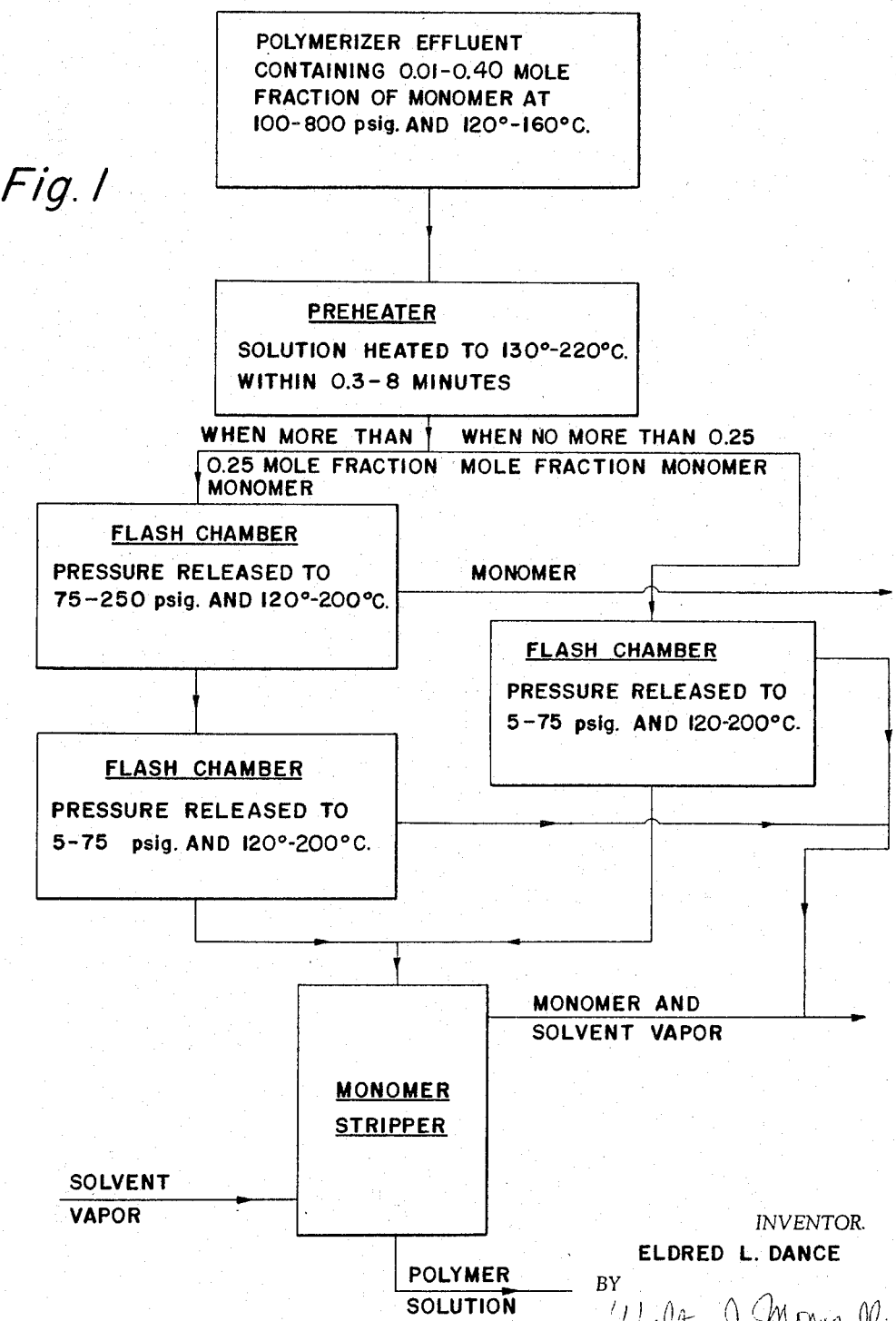

Oct. 18, 1966 E. L. DANCE 3,280,091
MONOMER RECOVERY PROCESS
Filed Feb. 6, 1963 2 Sheets-Sheet 2

INVENTOR.
ELDRED L. DANCE
BY
ATTORNEY

United States Patent Office 3,280,091
Patented Oct. 18, 1966

3,280,091
MONOMER RECOVERY PROCESS
Eldred L. Dance, Concord, Calif., assignor to The Dow Chemical Company, Midland, Mich., a corporation of Delaware
Filed Feb. 6, 1963, Ser. No. 256,737
12 Claims. (Cl. 260—93.7)

This invention relates to a process for the recovery of ethylene, propylene and/or butene monomer from the reaction product of a continuous polymerization system. More specifically, it relates to a flash distillation-stripping combination process in which the recovered monomer and solvent are recovered in a condition suitable for immediate recycle to the polymerizer.

The reactor effluent from a polymerizer, such as for propylene, contains a substantial quantity of unreacted monomer. For example, in a solution polymerization process for manufacturing polyproylene, the polymerizer effluent normally contains about 0.01 to 0.4 mole fraction of unreacted monomer, calculated on the polymer-free basis. Some propane and other close boiling impurities, present in the initial propylene feed, build up in concentration in the recycled propylene and are also present in the effluent. Reference to propylene or propylene monomer is generally intended to include such impurities since they remain associated with the monomer until special steps are taken to separate them.

For economical operation, this unreacted monomer must be recovered, preferably free from water and preferably in a condition suitable for recycle to the polymerizer. It is also necessary that the manner of recovery does not cause the formation of substantial amounts of low molecular weight and/or amorphous polymer during the recovery steps. Such polymerization during the recovery step means the loss of substantial amounts of monomer. Moreover, the presence of the low molecular weight or amorphous polymer results in contamination of the desired type of polymer formed in the polymerizer.

It is also desirable that the unreacted monomer is separated from the polymer solution before any operation is effected for the removal or deactivation of catalyst. By such prior monomer separation, the necessity for removing from recycle monomer any contaminants which are introduced in the catalyst deactivation step is avoided. Recovery of untreated monomer before the deactivation step is also advantageous in that the amount of solution to be treated in the deactivation step is reduced. Furthermore, the pressure at which the deactivation operation must be conducted in order to prevent vapor formation is much lower when most of the monomer has already been removed.

While it would appear that such a separation might be a simple matter, numerous difficulties have been encountered in attempting such a separation of the unreacted monomer before the catalyst deactivation step. First, since the catalyst is still active, the solution cannot be exposed to conditions which would continue to produce polymer. Since the production of low molecular weight and amorphous polymer is favored by higher polymerization temperatures, raising the temperature of the reaction solution for any prolonged period generally produces this undesired result.

Second, attempts to flash distill monomer from such solutions by release into a chamber of reduced pressure very often is accompanied by sufficient cooling to take the temperature of the polymer solution down to the precipitation temperature. This results in the production of a stable solid or semi-solid foam which is carried through the vapor space in the equipment and pipes. As a result, valves, equipment and pipes become plugged.

Thirdly, the use of low pressures may result in the formation of a vapor phase with resultant instability of flow in the preheater. It soon becomes obvious, therefore, that the separation of unreacted monomer before the catalyst deactivation step is not a simple matter.

In accordance with the present invention, it has now been found that such a separation can be effected without the above disadvantages by careful control of (a) the residence time in preheating the monomer-polymer product solution for subsequent flash distillation of the major portion of the monomer content, and (b) the flash operation in accordance with the amount of monomer contained in the solution to control the temperature reached as a result of such flash removal of monomer, and a subsequent stripping operation which substantially completely removes the remaining monomer and simultaneously conditions the solvent for recycling to the polymerization zone.

In accordance with this invention, the monomer-polymer solution coming from the polymerizer is taken to a preheater and heated to a temperature determined in accordance with the monomer content of such solution, with the residence time in such preheater being carefully controlled to prevent polymerization to substantial amounts of low molecular weight and/or highly amorphous polymer. Preferably, the preheat temperature is in the range of 130–220° C., and the residence time is in the range of 0.3–8 minutes. When the temperature is in the higher portion of the aforementioned range, the residence time is advantageously in the lower part of the aforementioned residence time range. Likewise, when the lower preheat temperatures are used, the residence time advantageously can be in the upper part of the specified residence time range.

The required low residence time-preheating is preferably effected in a tube and shell type of heat exchanger in which the monomer-polymer solution is passed through small diameter tubes which provide short distances for heat transfer through the solution with resultant minimum residence time. However, although the tube and shell type of heat exchanger is preferred and found to be particularly effective for this purpose, any other type of heat exchanger which will effect equivalent preheating of the solution in the same residence time can be used in the practice of this invention. For example, flow of the solution between heated, closely spaced flat plates, with resultant short heat-transfer distances through the liquid, is satisfactorily effective.

In the accompanying drawings, FIG. 1 is a flow sheet representing various steps of the process of this invention.

In accordance with the flow sheet of FIG. 1, the process of this invention involves the treatment of polymerizer effluent containing .01–0.4 mole fraction of monomer at 100–800 p.s.i.g. and 120°–160° C. This effluent is passed into a preheater, preferably of the tube and shell type, which has relatively short liquid distances for heat transfer, but in any case is capable of effecting heating of the solution to 130°–220° C. within 0.3–8 minutes. The solution exiting from the preheater preferably has a pressure of 100–800 p.s.i.g. As indicated by FIG. 1, the flashing operation can be either a one step or two step operation. If the monomer content is above 0.25 mole fraction (based on the polymer-free portion of the solution), the flash operation is preferably performed in a two step operation, the second flash step being advantageously performed in the upper free space of the stripper. In this two step flashing the initial flashing is effected by releasing into a chamber maintained at 75–250 p.s.i.g. so that the resultant temperature of the solution is 120°–200° C. The second flashing is effected by releasing this solution flowing from the first flash chamber into a chamber maintained at a pressure of 5–75 p.s.i.g. so that the resultant temperature of the solution is 120°–200° C. In the single step flashing the preheated effluent is released into a flash chamber maintained at a pressure of 5–75 p.s.i.g. whereby a temperature of 120°–200° C. is maintained in the resultant solution. Monomer vapor is allowed to escape from each flash chamber while the liquid solution of polymer flows from an outlet in the lower portion of the flash chamber.

Obviously the temperature of the solution must be maintained above that at which polymer will be precipitated. This temperature will vary according to the polymer content of the solution, the particular characteristics or solubility of the polymer, and the solvent power of the particular solvent.

When a substantial amount of monomer is present in the original polymer effluent, a two-stage flash operation is preferred to give a desired degree of monomer removal without excessive cooling and also to reduce the vapor space requirements. At lower monomer concentrations in the reactor effluent, e.g. 0.25 mole fraction or less, the two-stage flash system is not necessary and a single flash system is sufficient and is preferred from the standpoint of simplicity. The second flash in the two-stage flash system and the single flash system can be conducted in the free space above the top tray on the stripping unit.

In addition to other advantages, when the monomer content is above 0.25 mole fraction, the two-stage flash system has the advantage that the final flash gives a higher temperature due to the fact that the propylene removed at the high pressure of the first stage flash carries less xylene with it. Thus, approximately 80% of the propylene is removed before the pressure is lowered enough to permit appreciable xylene boil-off. A lower amount of xylene vaporization results in a lower heat abstraction from the liquid phase, and therefore, a higher final flash temperature. In the second flash, the mole fraction and partial pressure of the xylene is higher.

From either the above-described single stage flash operation or the two-stage flash operation, the polymer solution is passed through the monomer stripper which preferably comprises a column having a series of sieve plates over which the solution passes before it flows downward through downcomers. Solvent vapor which is fed in at the bottom of the column comes into intimate contact with the solution by passing through the sieve openings and bubbling through the depth of solution on each sieve plate. Then the vapor passes out a vapor outlet at an upper region of the column, through which outlet monomer vapor also passes. The polymer solution thus flows down the column and passes out through an outlet in a lower region of the stripper to a storage tank or immediately to processing equipment for recovery of the polymer. With a polymer-xylene solution exiting from the stripper, the process of this invention effects such substantially complete removal of the monomer that the solution flowing from the stripper has only 0.66% of the monomer originally present in the polymerizer effluent.

In a two-step flash operation of this invention in which the preheated solution is flashed into the first stage flash chamber at 100 p.s.i.g. and 142° C. approximately 82% of the monomer is removed in this first flashing. In the second stage flash which is conducted at the top of the stripper at a pressure of 19 p.s.i.g. and a temperature of 130° C., another 14% monomer is removed so that the liquid flowing to the top tray of the stripper has only about 4% of the monomer remaining. By the time this has passed through the stripper, only 0.66% of the monomer remains. The vapor exiting from the top of the stripper, including that flashed upon entry to the top region of the stripper, is fed to a condenser system in which the solvent is condensed. When the solvent is xylene, this condensed material contains approximately 1.4 percent by weight of monomer. The remaining uncondensed monomer goes to a compressor for recycle to the polymerizer. The uncondensed monomer contains approximately 1.6 percent by weight of xylene which is likewise recycled.

Figure 2:
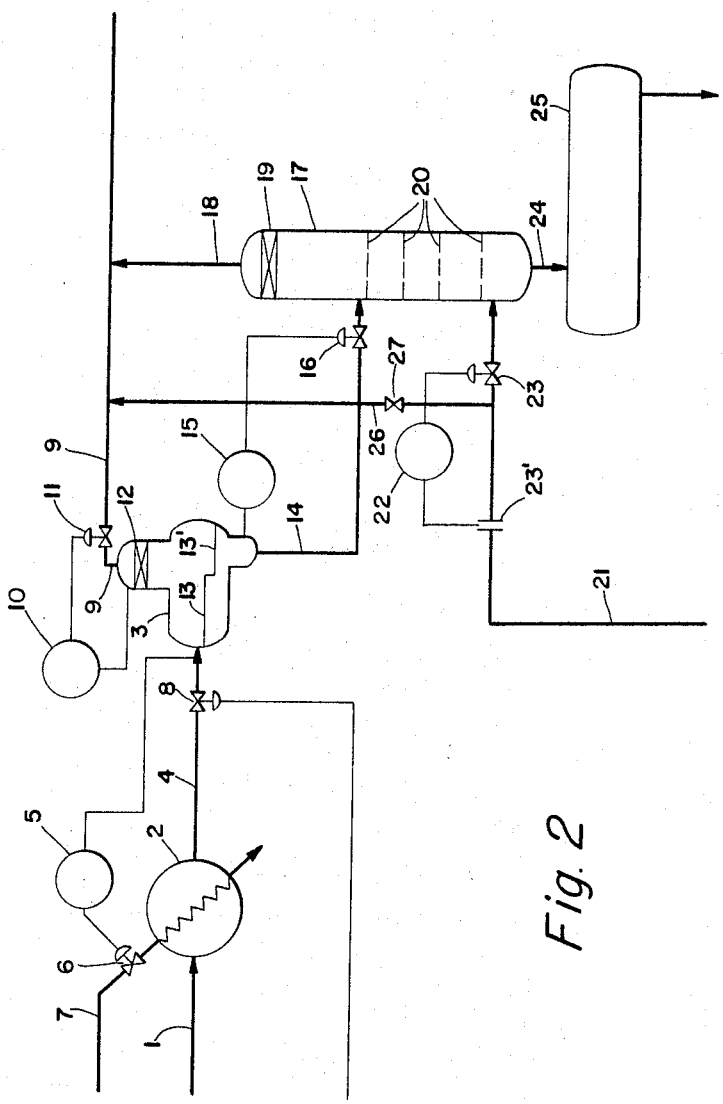

In a typical arrangement of apparatus as shown in the flow sheet of FIG. 2, a polymer solution containing unreacted monomer coming from the polymerizer (not shown) is fed to the system through line 1 into preheater 2. This preheater, as discussed above, is one capable of effecting rapid heat transfer to this solution so as to require only a very brief residence at the preheat temperature before being passed into flash tank 3 through line 4. Temperature responsive control 5 has a temperature sensing means located in line 4 just prior to the point of entry into flash tank 3. In accordance with variations in the temperature of the solution flowing through line 4, this temperature responsive control 5 actuates valve 6 to increase or decrease the rate of flow of heating medium passing through line 7 into preheater 2 and in indirect heat transfer contact with the polymer-monomer solution. A pressure responsive control (not shown) which responds to variations in pressure in the effluent exit line from the polymerizer actuates valve 8 so as to increase or decrease the rate of flow of solution through line 4.

At the top of flash tank 3 there is a vapor outlet line 9 through which the vaporized monomer escapes. Variations in the pressure at the top of flash tank 3 either below or above the desired range affects responsive pressure control 10 which actuates valve 11 to decrease or increase the rate of flow through line 9. Dephlegmator 12 prevents a mist of liquid particles from flowing out with the monomer vapor. The liquid in flash tank 3 flows over trays 13 and 13' into the bottom of flash tank 3 where the rate of outflow through line 14 is controlled by liquid level control 15 which actuates valve 16 to increase or decrease the flow rate in line 14.

The pressure in flash tank 3 is maintained at such a level that there is little tendency for the solvent to vaporize and pass out with the monomer vapor exiting through line 9. Moreover conditions are maintained so that sufficient heat is retained in the liquid passing out of flash tank 3 through line 14 that it still can be flashed to a lower pressure for additional flash vaporization of propylene monomer. However, since the second flashing obviously has to be conducted at a lower pressure, a higher proportion of solvent is present in the vapor emanating from the second flashing. This second flashing is advantageously effected in the upper region of a monomer stripper. In cases where the effluent from the polymerizer has relatively little monomer therein, e.g. 0.25 mole fraction or less, flash tank 3 can be dispensed with and a single stage flashing effected at the top of stripper 17. If preferred, however, flash tank 3 can be retained in such cases and the pressure therein maintained at a lower level and the liquid exiting therefrom fed directly into the stripper without a second flashing. With monomer concentrations greater than 0.25 or 0.3 mole fraction in the polymerizer effluent, the two-stage, step-wise or two-stage flashing is preferred.

The effluent therefore passes from either flash tank 3 or in some cases as pointed out above, directly from preheater 2 into the upper region of stripper 17 which is maintained at a lower pressure than in line 14. The monomer vapor resulting from the flash distillation in this upper region of the stripper passes out through line 18 after going through dephlegmator 19 which guards against the outflow of liquid mist with the vapor. The liquid solution passes downward in stripper 17 in intimate contact with solvent vapor which is passed upward through the stripper. While various other forms of liquid vapor contact columns can be used, the stripper preferably comprises a series of sieve trays 20 on which the solution collects and then passes across each tray and then to the next adjacently lower tray by downspouts (not shown) and thereby comes into contact with the solvent vapor passing upward through the vapor spaces between the sieve trays, through perforations in each tray, and through the liquid collected on the trays.

Solvent vapor passing out through line 18 with the monomer vaporized during the flash distillation in the upper region of the stripper can be condensed by chilling the vapor in line 18 prior to its entry into line 9 and before mixing with the monomer vapor therein or can be fed directly into line 9 and the entire stream subsequently chilled to condense solvent therefrom. After the solvent is substantially condensed from the monomer vapor, the uncondensed monomer is fed to a compressor for recycling to the polymerizer. Since the monomer has not been water-washed or otherwise contaminated, it is in a suitable condition for immediate recycling. As the hydrocarbon impurities in the original monomer feed build up in concentration, a certain amount of the monomer is drawn off for the purpose of removing such impurities.

While less than the total amount of solvent used in the polymerizer is generally sufficient to effect the stripping operation in stripper 17, it is generally preferred to vaporize and pass through the stripper the entire amount of recycle solvent which is recovered from the subsequent polymer separation step. This is done for the purpose of conditioning the solvent for re-entry into the polymerizer. Since the solution passing downward through the stripper has catalyst therein which has not been deactivated, the residual activity of the catalyst serves to remove any moisture or other catalyst reactive impurities that may have been picked up by the solvent during the subsequent treatment steps of the polymer-solvent solution after it leaves the stripper.

Thus solvent vapor is fed through line 21 into the bottom of stripper 17. The rate of flow of solvent vapor is controlled by flow rate control 22 which actuates valve 23 accordingly. The monomer-stripped solution passes out the bottom of stripper 17 through line 24 into polymer storage tank 25 or directly into equipment for subsequent processing to recover the polymer.

As indicated by the process flow conditions of FIG. 1, the polymerizer effluent containing 0.01–0.4 mole fraction of monomer at 100–800 p.s.i.g. and at 120°–160° C. is preheated to 130°–220° C. within 0.3–8 minutes. In cases where the monomer content is no more than 0.25 mole fraction, the flashing can be effected in a single stage, preferably in the open space at the top of a monomer stripper. Then this heated solution is immediately released into a flash chamber at a pressure of 5–75 p.s.i.g. with a resultant temperature in the range of 120°–200° C. In cases where the monomer content of the effluent is above 0.25, the flashing is advantageously effected in two stages, the first-stage flashing being released to a pressure of 75–250 p.s.i.g. (with a resultant temperature of 120°–200° C.) and the second-stage flashing, preferably in the upper open region of the monomer stripper, to a pressure of 5–75 p.s.i.g. (with resultant temperature of 120°–200° C.). The remaining monomer is then stripped from the polymer solution by countercurrent flow of solvent vapor through the liquid, advantageously in a column having a number of sieve trays therein.

As previously indicated this process typically results in a monomer vapor stream from a first stage flash in a two-flash system of approximately 82% of the monomer originally present in the polymerizer effluent, approximately an additional 14% removal in a second stage flash and approximately an additional 3% removed in the monomer stripper. Generally the polymer solution flowing from the bottom of the stripper contains less than 1%, in most cases, less than 0.7% of the monomer originally present in the reactor effluent.

When the flashing is effected in one stage, that is when the original monomer content is less than 0.25 mole fraction, the monomer removal at the end of this single flashing is typically 95–96% of the monomer originally present in the polymerizer effluent. Another 3–4% is removed in the stripper.

The process of this invention is best illustrated by the following examples. These examples are intended merely for illustrative purposes and the invention is not to be limited in scope nor the manner in which it can be practiced by the specific descriptions of these examples. In these examples and throughout the specification, reference to parts and percentages are to parts and percentages by weight.

EXAMPLE I

An effluent stream from a propylene polymerizer is passed through equipment of the type indicated by the flow sheet of FIG. 2. This effluent stream has a flow-rate of 9,157 pounds per hour comprising 750 pounds of polypropylene, 6,742 pounds of xylene and 1,665 pounds of propylene (0.38 mole fraction) containing a small amount of propane as impurity. This solution has a pressure of 455 p.s.i.g. and a temperature of 122° C. as it enters the preheater 2. Steam is the heating medium used in this preheater. The solution is heated by indirect heat exchange with steam in the preheater to a temperature of 167° C. within 2 minutes at a pressure of 455 p.s.i.g.

The preheated solution is immediately released into flash tank 3 which is maintained at a pressure of 100 p.s.i.g. and the resultant solution has a temperature of 142° C. The vapor exiting through line 9 from the top of flash tank 3 flows at the rate of 1,818 pounds per hour comprising 1,350 pounds of propylene and 468 pounds of xylene vapor. The liquid flowing from the bottom of flash tank 3 through line 14 flows at a rate of 7,339 pounds per hour, comprising 750 pounds of polymer, 6,274 pounds of xylene and 315 pounds of propylene. This liquid is at a temperature of 130° C. when it reaches the inlet to the flash chamber at the top of stripper 17 where a pressure of 19 p.s.i.g. is maintained.

As a result of the heating effected in the stripper the liquid at the top tray has a temperature of 172° C. and at the bottom of the stripper a temperature of 174° C. The vapors exit from the top of the stripper at a pressure of 19 p.s.i.g. and have a temperature of 169° C. The vapor stream passing out line 18 from the top of the stripper flows at a rate of 6,578 pounds per hour comprising 304 pounds of propylene and 6,274 pounds of xylene. This stream is chilled to a temperature of 35° C. in order to condense the xylene. The uncondensed propylene passes on to a compressor (not shown) where it is pressurized for recycle to the polymerizer.

Xylene vapor, advantageously from recycle xylene, is passed through line 21 into the bottom of the stripper at a rate of 7,579 pounds per hour and at a temperature of 178° C. and pressure of 23.5 p.s.i.g. The liquid exiting from the bottom of the stripper through line 24 flows at a rate of 8,340 pounds per hour and comprises 750 pounds of polymer, 7,579 pounds of xylene and 11 pounds of propylene. This liquid is eventually treated by conventional methods to deactivate the catalyst and the polymer separated from the solvent. Xylene is eventually vaporized from the deactivated polymer solution and recycled through line 21 to the propylene stripper. Line 26 is provided in case it is desired to bypass some of the xylene vapor around the propylene stripper and directly into line 9. This is effected by opening valve 27. However, as indicated above it is preferred to pass all the xylene recycle vapor through the propylene stripper so that it will be conditioned for recycle into the polymerizer after it is condensed from the propylene vapor.

EXAMPLE II

The procedure of Example I is repeated using a continuous polymerization system effluent stream containing 0.23 mole fraction of propylene. In place of the two-step flashing operation of Example I, a one-step flashing is effected by preheating the solution to a temperature of 160° C. with a preheater residence time of 2 minutes.

This preheated solution is released immediately into the vapor space of stripper 17 by having line 4 connected to stripper 17 at the same point where line 14 feeds into stripper 17 in FIG. 2. The pressure at this point in the free space in stripper 17 is maintained at 30 p.s.i.g. The vapor stream passing through line 18 from the top of the stripper carries off approximately 99.3% of the propylene present in the original effluent and the liquid passing out line 24 at the bottom of the stripper has approximately 0.68% of propylene therein based on the amount originally present.

EXAMPLE III

An effluent stream from a butene-1 polymerizer, said effluent containing 5.3 pounds per hour of butene-1, 90 pounds per hour of xylene, and 10 pounds per hour of polybutene is preheated to 170° C. under a pressure of 200 p.s.i.g. The solution is immediately flashed into the top of a monomer stripper maintained at a pressure of 19 p.s.i.g. The resulting temperature immediately down stream of the flash valve is 152° C. Recycle xylene vapor is fed to the bottom of the stripper at a rate of 100 pounds per hour where the temperature is 174° C.

The polymer solution leaving the bottom of the stripper contains 0.2 pounds per hour $C_4H_8$, 100 pounds per hour of xylene and 10 pounds per hour of polybutene while the vapor from the top of the stripper consists of 5.1 pounds per hour of butene-1 and 90 pounds per hour of xylene.

EXAMPLE IV

An effluent stream from a reactor, consisting of 1.26 pounds per hour of ethylene, 90 pounds per hour of xylene and 10 pounds per hour of polyethylene is preheated to 170° C. under a pressure of 400 p.s.i.g. The solution is immediately flashed into the top of a monomer stripper maintained at a pressure of 19 p.s.i.g. The resulting temperature just after the single stage flash is 156° C. and due to the relatively high volatility of ethylene the mole fraction in the liquid phase is only 0.35 mole percent. Although the single flash, in this case, would result in a good recovery of the ethylene from the polymer solution, the stripper is used following the flash to purify the solvent vapors and to strip the ethylene still further. Recycle xylene vapor at a rate of 100 pounds per hour is fed to stripper bottom at a temperature of 174° C.

The polymer solution leaving the bottom of the stripper contains 0.01 pound per hour of ethyelne, 100 pounds per hour of xylene, and 10 pounds per hour of polymer while the vapor from the top of the stripper contains 1.25 pounds per hour of ethylene and 90 pounds per hour of xylene.

In the practice of this invention it is possible and practical to reduce the monomer content to less than about 3 percent by weight of the amount originally present in the effluent, and in the case of propylene and ethylene generally less than 1 percent of that originally present.

In addition to effluent streams from polymerizers in which homopolymerization of ethylene, propylene and butene is effected, the process of this invention can be used in the recovery of such monomers from effluent streams of polymerizers in which these monomers are being copolymerized either with each other or with other comonomers such as other olefinic compounds, preferably hydrocarbon, including higher olefins, e.g. n-pentene-1, n-octene-1, etc., styrene, vinyl toluene, vinyl naphthalene, vinyl diphenyl, ar-chloro-styrene, ar-ethyl styrene, vinyl xylene, vinyl cyclohexane, etc.

The solvents used in the practice of this invention are those normally used for solution polymerization of such monomers. Generally these are aromatic or aliphatic hydrocarbons free of ethylenic or acetylenic unsaturation and of appropriate boiling ranges, such as xylene, heptane, octane, etc.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims.

The invention claimed is:
1. The process for recovering monomer from the effluent solution of a polymerizer, said effluent having dissolved therein the polymer product and a monomer selected from the class consisting of ethylene, propylene and butylene, comprising the steps of:
   (a) preheating said effluent prior to any processing steps for deactivation of the polymerization catalyst therein or removal of polymer therefrom to a temperature of 130°–220° C. and a pressure in the range of 100–800 p.s.i.g. within a preheating residence time of 0.3–8 minutes,
   (b) immediately thereafter releasing said heated effluent into enclosed space maintained at a pressure in the range of 5–75 p.s.i.g., whereby the predominant portion of contained monomer is vaporized therefrom and maintaining the temperature in the range of 120°–200° C. and above that at which the polymer contained therein will precipitate therefrom;
   (c) immediately thereafter subjecting the liquid flowing out of the lower region of said enclosed space into intimate countercurrent contact with vapor of a solvent of the identical type present in said effluent, the amount of said vaporized solvent and the time of said intimate contact being sufficient to reduce the monomer content of said effluent to less than about 3 percent by weight of the amount of monomer originally present in said effluent.

2. The process of claim 1 in which said release into said enclosed space is effected in two steps, the first step comprising releasing said preheated effluent into a first enclosed space maintained at a pressure of 75–250 p.s.i.g. and from which first enclosed space the vaporized monomer is allowed to escape, and, in the second step, the resultant effluent flowing from the lower region of said first enclosed space being released into a second enclosed space maintained at a pressure of 5–75 p.s.i.g. from which second enclosed space the resultant vaporized propylene is also allowed to escape.

3. The process of claim 1, in which the monomer content of said effluent is in the range of 0.01–0.4 mole fraction based on the polymer-free content of said effluent.

4. The process of claim 3, in which said monomer is propylene.

5. The process of claim 2 in which the monomer content of said polymerizer effluent is in the range of 0.2–0.4 mole fraction based on the polymer-free content of said effluent.

6. The process of claim 5, in which said monomer is propylene.

7. The process of claim 1 in which the monomer content of said polymerizer effluent is in the range of 0.05–0.25 mole fraction based on the polymer-free content of said effluent.

8. The process of claim 7, in which said monomer is propylene.

9. The process of claim 1, in which said monomer is propylene.

10. The process of claim 2, in which said monomer is propylene.

11. The process of claim 1, in which said solvent vapor includes catalyst-reactive impurities which are made catalyst-inert by contact with spent catalyst in the effluent from said preheating step.

12. The process of claim 2, in which said solvent vapor includes catalyst-reactive impurties which are made catalyst-inert by contact with spent catalyst in the effluent from said preheating step.

References Cited by the Examiner

UNITED STATES PATENTS 2,919,265 12/1959 Brooks _____ 260—94.9
3,081,290 3/1963 Cottle _____ 260—94.9

OTHER REFERENCES

Perry, "Chemical Engineer's Handbook," 3rd edition, 1950, p. 668.

JOSEPH L. SCHOFER, *Primary Examiner.*

E. M. OLSTEIN, L. EDELMAN, *Assistant Examiners.*